United States Patent [19]

Arkless

[11] 4,053,577

[45] Oct. 11, 1977

[54] PROCESS FOR THE GASEOUS PHASE PRODUCTION OF METAL OXIDE PARTICLES

[75] Inventor: Kenneth Arkless, Stockton-on-Tees, England

[73] Assignee: Tioxide Group Limited, Billingham, England

[21] Appl. No.: 603,785

[22] Filed: Aug. 11, 1975

Related U.S. Application Data

[63] Continuation of Ser. No. 308,497, Nov. 21, 1972, abandoned.

[30] Foreign Application Priority Data

Feb. 18, 1972  United Kingdom ................ 7570/72

[51] Int. Cl.² ...................... C01G 1/03; C01G 23/04
[52] U.S. Cl. ................................ 423/592; 423/613; 423/659; 23/277 R
[58] Field of Search ............. 423/659, 613, 592; 23/277 C

[56] References Cited

U.S. PATENT DOCUMENTS

| 3,203,763 | 8/1965 | Kruse .................................. 423/613 |
| 3,361,525 | 1/1968 | De Rycke et al. ............... 423/613 X |
| 3,464,792 | 9/1969 | Herriman et al. .................... 423/613 |
| 3,549,633 | 12/1970 | Tabak ............................... 23/277 C |
| 3,582,278 | 6/1971 | Kulling et al. ....................... 423/613 |
| 3,690,840 | 9/1972 | Volker ............................ 23/277 C |

FOREIGN PATENT DOCUMENTS

45-24660  8/1970  Japan .................................. 423/613

*Primary Examiner*—Edward Stern
*Attorney, Agent, or Firm*—Schuyler, Birch, Swindler, McKie & Beckett

[57] ABSTRACT

Process and apparatus for the production of finely-divided metal oxides by the oxidation of the corresponding metal halide wherein a secondary gas is introduced into a heated primary gas through apertures in the reaction zone wall, the apertures formed with at least two different cross-sectional areas along their length, the small cross-sectional area being at the inlet end of the aperture for the secondary gas.

17 Claims, 1 Drawing Figure

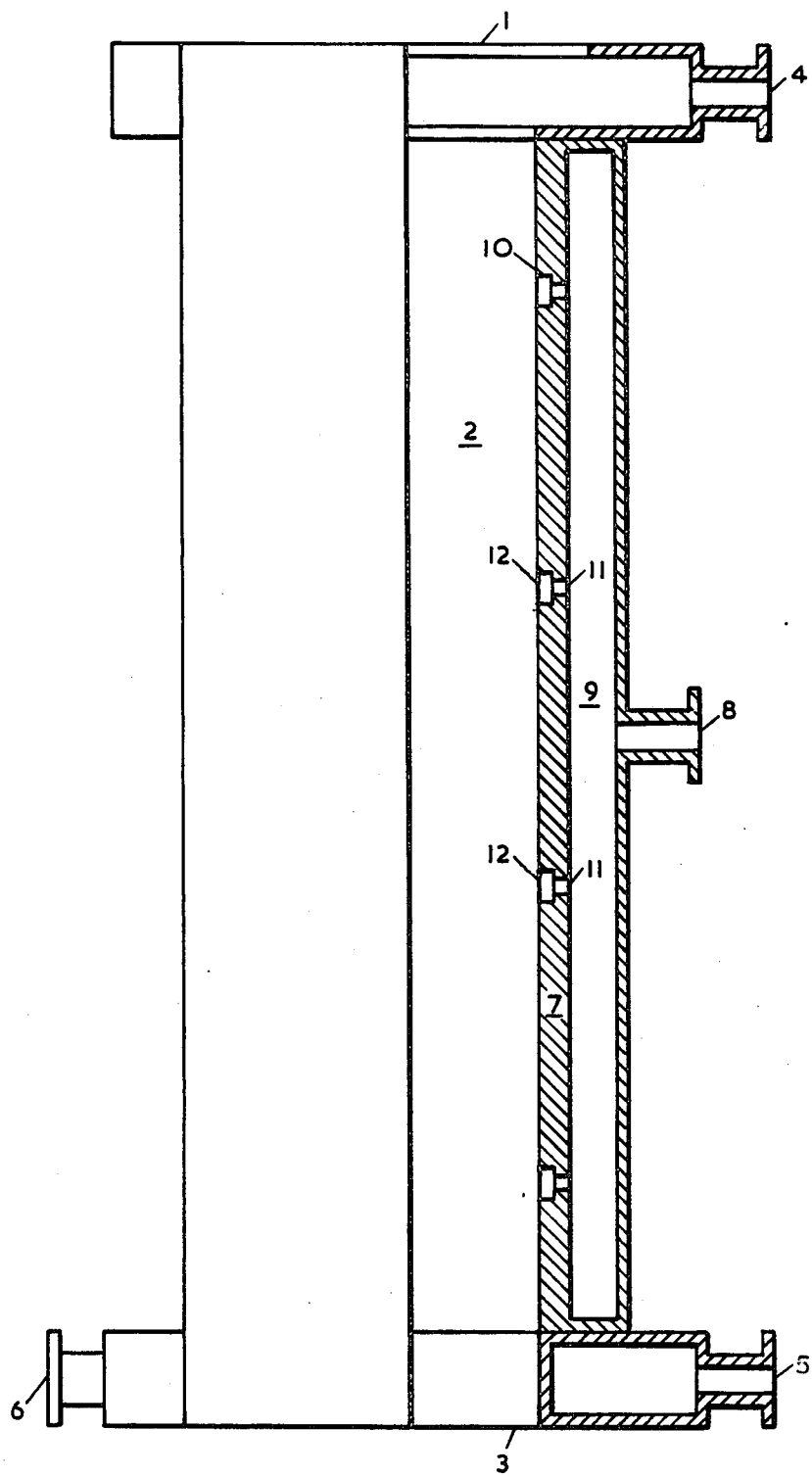

PROCESS FOR THE GASEOUS PHASE PRODUCTION OF METAL OXIDE PARTICLES

This is a continuation, of application Ser. No. 308,497 filed Nov. 21, 1972, now abandoned.

The present invention relates to a process and apparatus suitable for the production of finely-divided metal oxides by the oxidation of the corresponding metal halides at high temperatures.

In U.S. Pat. No. 3,464,792 there is described a process and apparatus for the production of finely divided metal oxides by the oxidation, at elevated temperature, of the vapour of the corresponding halide. The process and apparatus claims of this specification are directed to the introduction into one end of a reaction zone of an arc-heated primary gas (which may be an inert gas or one of the reactants) and the introduction into that primary gas of a secondary gas (which may be the oxidising gas and/or the metal halide) through an injector which forms at least part of the wall of the reaction zone and thus surrounds the primary gas stream and which is provided with apertures through which the secondary gas enters after it has been supplied in such a manner as to cool the wall of the injector device before entering the reaction zone through the apertures (and is thus preheated in doing so). FIGS. 5 and 6 of U.S. Pat. No. 3,464,792 show preferred embodiments of the apparatus and methods of operating the apparatus shown in these Figures are described in Examples 1 and 2 of the specification.

It has now been found that apparatus and processes similar to those described in U.S. Pat. No. 3,464,792 suffer from certain disadvantages, particularly in injection devices such as those shown in FIGS. 5 and 6, e.g. devices of increased length and which are provided with a large number of holes spaced along the wall of the device.

It is an object of this invention to provide apparatus and process which reduces or eliminates these disadvantages.

Accordingly, the present invention is a process for the production of finely-divided metal oxides by the oxidation of the corresponding metal halide comprising introducing into one end of a reaction zone a hot stream of primary gas consisting of an inert gas or the oxidising gas or the metal halide, introducing into the primary gas stream through an injection device surrounding at least part of the reaction zone and containing a plurality of apertures a secondary gas consisting of the oxidising gas and/or the metal halide, the secondary gas being supplied to the reaction zone in such a manner that it cools the wall of the injection device and is thereby preheated before it passes through the apertures into the primary gas stream and wherein the apertures are formed with at least two different cross-sectional areas along their length, the smaller cross-sectional area being at the inlet end of the aperture for the secondary gas.

The invention also comprises an apparatus suitable for the oxidation of a metal halide comprising a reactor having inlet and outlet ports at opposite ends and surrounded at least in part by an injection device having a plurality of apertures, means to supply a gas or vapour to the reactor in such a manner that the gas or vapour passes over at least part of the wall of the injection device before entering the reactor through the apertures and in which the apertures are formed with at least two different cross-sectional areas along their length, the smaller cross-sectional area being at the inlet end of the aperture for the gas or vapour.

It has been found that apparatus of the type described in U.S. Pat. No. 3,464,792 and particularly in FIGS. 5 and 6 of that specification, may suffer from significant accretion of metal oxide around the edge of the apertures through which the secondary gas enters the primary gas stream. This is particularly noticeable when using longer injection devices with a large number of apertures. At least one reason for this is believed to be the substantial pressure drop between the inlet port for the primary gas and the exit port for the reaction products necessitating the introduction of the secondary gas through the apertures at higher velocity than in shorter injection devices in order to ensure acceptable distribution of the gas through the apertures around the injection device. However, the higher velocity of the secondary gas entering the primary gas stream from the apertures tends to cause eddies and recirculation of the mixing reactants at that point which, in turn, causes the reactants to impinge upon the wall of the injection device, particularly around the apertures giving rise to deposition and accretion of metal oxide.

It has now been found that this disadvantage can be avoided if provision is made, after the secondary gas has entered the aperture at the required velocity for acceptable distribution, to reduce the velocity of the gas stream before it enters the stream of primary gas. The reduction in the velocity of the gas within the aperture is accomplished by increasing the cross-sectional area of the apertures between the first part of the apertures, the cross-sectional areas of which are carefully determined to ensure the desired distribution of the secondary gas through all the apertures, and the exit orifices into the primary gas stream.

The cross-sectional areas of the first part of the apertures which is necessary to ensure the desired distribution of the secondary gas through the apertures depends upon a number of factors, for example the gas pressure in the injection device, the volume of secondary gas to be introduced through the available apertures and the pressure at which the secondary gas can be supplied to the apertures initially and it is not possible, therefore, to give exact dimensions for this value. Generally, however, it has been found convenient to provide apertures in which the first part is a circular orifice having a diameter in the range 0.01 inches to 0.20 inches, particularly from 0.01 inches to 0.10 inches, and preferably one in the range 0.02 inches to 0.10 inches, particularly from 0.02 inches to 0.06 inches. It is, of course, not necessary that such orifices should be circular but these are preferred for ease of production.

Normally, the size of the first part of the aperture, i.e. the smaller diameter is selected to provide a pressure drop across this part of the aperture of from 0.1 to 10 p.s.i.g. and particularly of from 0.5 to 5 p.s.i.g., the preferred pressure drop within these ranges depending upon the scale of operation.

Normally, the first part of the aperture is of constant cross-sectional area from 10 to 50% of the length of the aperture, after which the cross-sectional area is increased sufficiently and for a sufficient distance to reduce the velocity of the gas to the required value. Again, these dimensions are difficult to specify for all cases but it has been found generally suitable to increase the cross-sectional area by increasing the diameter of the aperture (where circular) to a value in the range 0.05 inches to 0.50 inches and preferably to one in the range 0.10 inches to 0.30 inches, for the remaining length of the aperture, e.g. for a distance of at least 1.5 times and preferably at least 3 times the diameter of the larger aperture.

The total length of the aperture will, of course, depend upon the thickness of the wall of the injection device at that point and if this is small it may be preferable to increase progressively the cross-sectional area of the aperture to obtain the necessary reduction in the velocity of the secondary gas before it enters the primary gas stream.

It is essential for the purpose of the present invention that the cross-sectional area of the aperture should be increased after the first entry orifice and normally there are only two differing cross-sectional areas along the aperture. However, if desired, the cross-sectional area may be increased more than twice, for example three or four times or it may, if desired, be continuously increased from the smaller cross-sectional area to the exit orifice into the primary gas stream.

It is preferred that the wall of the injection device is of metal for ease of fabrication and for good heat conducting properties. Particularly suitable metals are aluminium, nickel and alloys of these metals or stainless steel.

It is also preferred that each group or groups of apertures through which the same secondary gas is to be introduced should be supplied by a common manifold, for example via a jacket surrounding that group or groups of apertures, since this simplifies the pipe work required for the supply of the secondary gas or gases and improves the cooling of the wall of the injection device.

Where longer injection devices are used, in particular, problems of expansion and contraction may arise and these can be avoided by providing for expansion by any suitable means, for example, by forming the walls of the injection device in sections with "steps" between which allow for expansion. Such steps can, if desired, be spring loaded. Similarly, the surrounding jacket(s) to which the secondary gas or gases are supplied before entering the apertures may be in the form of bellows (which may also be spring-loaded) to accommodate expansion and contraction.

The secondary gas is either premixed oxidising gas and metal halide, for example oxygen and titanium tetrachloride (with additives such as silicon tetrachloride and/or aluminium chloride, if required) or it may consist of the oxidising gas or the metal halide (which may be separately introduced through different groups of apertures in the same injection device, again each containing an additive(s), if desired).

If the primary gas is an inert gas which is merely used as a heat carrier then both reactants are, of course, normally introduced through the injection device. If one of the reactants constitutes the primary gas then only one reactant need be introduced through the injection device. It is preferred, however, to use part of one reactant, for example oxygen, as the primary gas and to introduce the remaining oxygen and the metal halide either premixed and/or separately through the injection device (with apropriate additions of aluminium chloride and/or silicon tetrachloride where the metal halide is titanium tetrachloride).

The primary gas is preferably arc-heated as described and claimed in U.S. Pat. No. 3,464,792 but is not necessarily so. For example, it may consist of any suitable gas composition capable of initiating and maintaining the oxidation of the metal halide such as the combustion products of carbon monoxide or a hydrocarbon gas although, in the latter case, the presence of water will lead to the formation of hydrogen chloride which may be undesirable.

The products of reaction are preferably collected by conventional means such as sock filters after initial cooling, for example by means of a primary cooler and by mixing with recycled tail gas. Alternatively, they may pass into a reactor in which more metal halide is being oxidised to the corresponding metal oxide. In such cases the products of reaction from the present invention may form nuclei for the subsequent oxidation of metal halide.

Finally, where the product is a pigmentary metal oxide such as titanium dioxide, it will normally be subjected to conventional after-treatments such as classification, coating, drying and/or milling before use.

The attached Figure shows one embodiment of the invention in which the hot primary gas enters through port 1 into injector/reactor 2 and leaves through exit port 3. A purge of gas is introduced through 4 to maintain the face of the apparatus producing the primary gas free from accretion and a coolant is introduced into 5 and withdrawn from 6 to minimise heat transfer from any subsequent reaction to the wall 7 of the injection device. Premixed reactants forming the secondary gas are introduced through 8 into jacket 9 in which they flow over the surface of the wall of the injection device, thereby cooling it, before they enter the reactor containing the hot primary gas via apertures 10. Apertures 10 represent diagrammatically numbers of apertures at each level of similar cross-section to those shown in which the reactants enter from the surrounding jacket through orifices 11 of smaller cross-sectional area and leave the aperture through orifices 12 into the reactor (at reduced velocity compared with that at which they issued from orifices 11).

The following Example describes one method of carrying out the process of the present invention:

Example

A reactor of the type shown in the attached Figure was set up consisting of an aluminium tube 5 inches outside diameter, 3 inches internal diameter and 6 inches long which was surrounded by a jacket into which premixed oxygen and titanium tetrachloride containing sufficient aluminium chloride and silicon tetrachloride to produce 2% by weight of alumina and 0.3% silica respectively by weight on the $TiO_2$.

The wall of the injector device was provided with a total of 392 apertures in 14 rows of 28. Each aperture consisted of a first orifice of 0.047 inches diameter which extended for 0.20 inches after which the orifice was increased to a diameter of 0.125 inches for the remaining length of the aperture.

Oxygen (12 grams moles/minute) was preheated in a plasma gun sealed to the top of the injector to an average temperature of 3,400° K and passed into the reactor together with 1 g.mole/minute through inlet 4. The premixed oxygen/titanium tetrachloride/aluminium trichloride/silicon tetrachloride mixture previously mentioned, preheated to 150° C, was introduced into the jacket surrounding the reactor at a rate of 23 gram/moles oxygen and 24 gram/moles titanium tetrachloride per minute.

The titanium dioxide produced was recovered and found to be of excellent quality.

The process was operated as described above for 48 hours after which the walls of the injection device were found to be substantially free of $TiO_2$ accretion, particularly around the apertures.

From previous experience it was known that operating a similar process under similar conditions but with apertures of constant cross-sectional area (equal to that of the smaller orifice of the apertures referred to above) over a similar period of time caused a noticeable accretin of $TiO_2$ on the wall of the injection device, particularly around the apertures.

What is claimed is:

1. In a process for the production of finely-divided metal oxides which comprises oxidizing the corresponding metal halide with an oxidizing gas by introducing into one end of a reaction zone a hot stream of primary gas selected from an inert gas, the oxidizing gas or the metal halide, introducing a secondary gas selected from the oxidizing gas, the metal halide or mixtures thereof into the primary gas stream through an injection device surrounding at least part of the reaction zone, said injection device comprising a wall having a plurality of separate apertures therethrough, each aperture having an inlet end and an outlet end and each aperture connecting the reaction zone to a secondary gas jacket, said wall dividing said reaction zone from said jacket, the inlet end of said aperture being at the interface of said wall and said reaction zone, the secondary gas being supplied to the reaction zone through said jacket in such a manner that it cools the wall of the injection device and is thereby preheated before it passes through the apertures into the primary gas stream, the inprovement comprising forming said apertures with at least two segments of different cross-sectional areas along their length, the segment of smaller cross-sectional area being at the inlet end of the apertures for the secondary gas, and the segment of larger cross-sectional area being at the outlet end of said apertures, said segment of larger cross-sectional area being of sufficient cross-section and extending for a sufficient length of said apertures to preclude substantial accretion of metal oxide around the edge of the aperture.

2. A process as claimed in claim 1 wherein the length of that segment of the aperture which is of larger cross-section is at least 1.5 times the diameter of said segment of larger cross-section.

3. A process as claimed in claim 2 wherein the apertures have a smaller cross-sectional area with a diameter in the range 0.01 inches to 0.20 inches.

4. A process as claimed in claim 2 wherein the apertures are circular orifices having a smaller diameter in the range 0.01 inches to 0.20 inches and a larger diameter in the range 0.05 inches to 0.50 inches.

5. A process as claimed in claim 2 wherein said smaller cross-sectional area portion of said apertures is of sufficient diameter to provide a pressure drop across that part of the aperture of from 0.1 to 10 p.s.i., said smaller cross-sectional area portion extending from 10% to 50% of the length of the aperture.

6. A process as claimed in claim 1 wherein the apertures have a smaller cross-sectional area with a diameter in the range 0.01 inches to 0.20 inches.

7. A process as claimed in claim 6 wherein the diameter of said smaller cross-sectional areas of said apertures is in the range 0.02 inches to 0.10 inches.

8. A process as claimed in claim 1 wherein the pressure drop across the smaller cross-sectional area of the aperture is from 0.1 to 10 p.s.i.g.

9. A process as claimed in claim 8 wherein said pressure drop is in the range 0.5 to 5 p.s.i.g.

10. A process as claimed in claim 1 wherein the smaller cross-sectional area segment of the aperture extends for from 10% to 50% of the length of the aperture.

11. A process as claimed in claim 1 wherein the diameter of the aperture increases to one in the range 0.05 inches to 0.50 inches.

12. A process as claimed in claim 1 wherein the diameter of the aperture increases to one in the range 0.10 inches to 0.30 inches.

13. A process as claimed in claim 1 wherein the cross-sectional area between the inlet and outlet ends of each aperture continually increases from the smaller cross-sectional area of the inlet end of the aperture.

14. A process as claimed in claim 1 wherein the wall of the injection device is made of aluminum, nickel, alloys thereof or of stainless steel.

15. A process as claimed in claim 1 wherein the primary gas is oxygen and oxygen and metal halide comprise the secondary gas or gases.

16. A process as claimed in claim 1 wherein the primary gas is heated by passage through an electric arc.

17. In a process for the production of finely-divided metal oxides which comprises oxidizing the corresponding metal halide with an oxidizing gas by introducing into one end of a reaction zone a hot stream of primary gas selected from an inert gas, the oxidizing gas or the metal halide, introducing a secondary gas selected from the oxidizing gas, the metal halide or mixtures thereof into the primary gas stream through an injection device surrounding at least part of the reaction zone, said injection device comprising a wall having a plurality of separate apertures therethrough, each aperture having an inlet end and an outlet end and each aperture connecting the reaction zone to a secondary gas jacket, said wall dividing said reaction zone from said jacket, the inlet end of said aperture being at the interface of said wall and said reaction zone, the secondary gas being supplied to the reaction zone through said jacket in such a manner that it cools the wall of the injection device and is thereby preheated before it passes through the apertures into the primary gas stream, the improvement comprising forming said apertures with at least two segments of different cross-sectional areas along their length, the segment of smaller cross-sectional area being at the inlet end of the apertures for the secondary gas, and the segment of larger cross-sectional area being at the outlet end of said apertures, said segment of larger cross-sectional area being of sufficient cross-section and extending for a sufficient length of said apertures to preclude substantial accretion of metal oxide around the edge of the aperture, the length of said segment of larger cross-section being at least three times the diameter of said segment of larger cross-section.

* * * * *